United States Patent
Grimshaw et al.

[11] Patent Number: 6,149,773
[45] Date of Patent: *Nov. 21, 2000

[54] GENERATION OF ELECTRICITY FROM WASTE MATERIAL

[75] Inventors: Anthony John Grimshaw, Lockerley; Maurice Edward George Maton, Ashurst, both of United Kingdom

[73] Assignee: Waste Gas Technology Limited, Hampshire, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,028

[22] Filed: Dec. 13, 1996

Related U.S. Application Data

[63] Continuation-in-part of application No. 08/351,467, Dec. 6, 1994, abandoned.

[30] Foreign Application Priority Data

Jun. 9, 1992 [GB] United Kingdom ................. 9212183
Dec. 10, 1992 [GB] United Kingdom ................. 9225826

[51] Int. Cl.⁷ .............................. B09B 3/00; C10B 47/00; C10B 1/00
[52] U.S. Cl. ............................... 201/21; 201/25; 201/31; 48/111
[58] Field of Search ......................... 48/111; 201/21, 201/25, 31

[56] References Cited

U.S. PATENT DOCUMENTS

| | | | |
|---|---|---|---|
| 1,898,326 | 2/1933 | Wahlstrom | 201/21 |
| 2,494,695 | 1/1950 | Fisher | 201/35 |
| 2,511,709 | 6/1950 | Hemminger | 201/35 |

(List continued on next page.)

FOREIGN PATENT DOCUMENTS

| | | |
|---|---|---|
| 0 067 139 A1 | 12/1982 | European Pat. Off. . |
| 2 307 865 | 11/1976 | France . |
| 2 366 354 | 4/1978 | France . |
| 156 952 A1 | 12/1904 | Germany . |
| 28 21 825 A1 | 8/1979 | Germany . |
| 28 48 485 A1 | 9/1979 | Germany . |
| 30 48 350 A1 | 7/1982 | Germany . |
| 35 05 429 A1 | 8/1986 | Germany . |
| 291 550 | 6/1928 | United Kingdom . |
| 1 501 729 | 2/1978 | United Kingdom . |
| 1 531 106 | 11/1978 | United Kingdom . |
| 2 018 283 | 10/1979 | United Kingdom . |
| 1 584 401 | 2/1981 | United Kingdom . |

(List continued on next page.)

*Primary Examiner*—Walter D. Griffin
*Attorney, Agent, or Firm*—Marshall, O'Toole, Gerstein, Murray & Borun

[57] ABSTRACT

Apparatus (1) for producing gaseous energy which may be used as fuel for driving electricity generating means comprises an oven (2), a ram (11) for feeding gas-producing waste material to the oven (2), gas burners (5) for heating the waste material while in the oven (2), and a collection vessel (25) for collecting gaseous fuel liberated by heating the waste material. The oven (2) and waste material feeder duct (7) connected thereto are of airtight construction, so that combustion of the waste material is not allowed to take place. The airtight oven (2) has a central gasifier section (15) having an inlet end (15a) and an outlet end (15b). The feeder duct (7) is connected to the inlet end (15a) and an outlet duct (16) is connected to the outlet end (15b). The outlet duct (16) extends into the collection vessel (25), which has an upper end housing a gas filter (26) and a lower end connected to an ash receptacle (27). Gaseous fuel passing through the filter (26) enters a discharge fine (29) connected to a gas chiller unit (30). The unit (30) has a hot water/steam outlet (35), a cold water inlet (36), and a gas/vapor outlet (37) which discharges to a gas/water separator (38) wherein condensate (39) is collected, and gaseous fuel allowed to leave by way of a discharge line (40). The gas discharge line (40) incorporates a branch line (47) whereby usable gas is led away for combustion for driving the electricity generating means and a further branch line (48) whereby gas is fed to the oven burners (5) by way of a regulator valve (49) and a gas burner control unit (50).

22 Claims, 9 Drawing Sheets

U.S. PATENT DOCUMENTS

| | | | |
|---|---|---|---|
| 3,526,586 | 9/1970 | Saxton | 201/35 |
| 3,733,187 | 5/1973 | Feldmann | 48/209 |
| 3,736,111 | 5/1973 | Gardner et al. | 48/209 |
| 3,771,263 | 11/1973 | Borggreen et al. | 48/209 |
| 3,775,071 | 11/1973 | Hoffert et al. | 48/197 R |
| 4,084,521 | 4/1978 | Herbold et al. | 201/35 |
| 4,235,675 | 11/1980 | Bechthold | 201/2.5 |
| 4,235,676 | 11/1980 | Chambers | 202/118 |
| 4,300,915 | 11/1981 | Schmidt et al. | 48/197 R |
| 4,308,103 | 12/1981 | Rotter | 202/117 |
| 4,326,373 | 4/1982 | Giles | 60/39.02 |
| 4,632,731 | 12/1986 | Bodle et al. | 201/25 |
| 4,833,877 | 5/1989 | Ahland et al. | 60/39.02 |
| 5,290,327 | 3/1994 | Rossle | 48/111 |
| 5,302,254 | 4/1994 | Martin et al. | 201/21 |
| 5,369,947 | 12/1994 | Dummersdorf et al. | 60/39.02 |
| 5,423,891 | 6/1995 | Taylor | 48/197 R |

FOREIGN PATENT DOCUMENTS

| | | |
|---|---|---|
| 2 087 424 | 5/1982 | United Kingdom . |
| 2 134 921 | 8/1984 | United Kingdom . |
| 2 144 836 | 3/1985 | United Kingdom . |
| 2 212 797 | 8/1989 | United Kingdom . |
| 2 212 813 | 8/1989 | United Kingdom . |
| WO 93/25848 | 12/1993 | WIPO . |

GENERATION OF ELECTRICITY FROM WASTE MATERIAL

This application is a Continuation-in-Part of application Ser. No. 08/351,467 filed Dec. 6, 1994, now abandoned.

BACKGROUND TO THE INVENTION

This invention relates to the production of gaseous energy from waste material.

A major and widely-used method of waste disposal is landfill. However, there are significant problems associated with landfill including the lack of available landfill sites, the pollution of groundwater and the uncontrolled generation of gas.

Incineration is an alternative method of waste disposal alleviating the problems of landfill by burning off most of the organic constituents of the waste to leave a solid ash residue for disposal of considerably reduced volume. However, the exhaust fumes resulting from incineration are a source of pollution, and are difficult to treat in order to meet current environmental standards.

The invention is also concerned with the conversion of the waste material into disposable ash.

SUMMARIES OF THE INVENTION

According to one aspect of the invention, a method of producing gaseous energy from waste material comprises heating the waste material without allowing combustion of the waste material to take place in an oven means, the method being characterised by the provision of at least two hopper means for accommodating the waste materials, means whereby waste material is transferred from the first hopper means through the second hopper means and continuously fed to the oven means for heating of the waste material, and means whereby air is restricted from passing from the first hopper means to the second hopper means.

According to another aspect of the invention, apparatus, which may be used to perform the said method, comprises an oven feed means for continuously feeding the waste material to the oven, means for heating the waste material while in the oven without allowing combustion to take place, means for collecting gaseous energy liberated by heating the waste material, the oven feed means comprising at least a first and a second hopper means for accommodating the waste material, whereby the waste material is transferred from the first hopper means to the second hopper means before heating takes place, and means are provided for restricting air from passing from the first hopper means to the second hopper means.

Means are preferably provided whereby at least some of the collected gaseous fuel is used to heat waste material present in the oven.

BRIEF DESCRIPTION OF THE DRAWINGS

The various aspects of the invention will now be described by way of example only, with reference to the accompanying semi-diagrammatic drawings, wherein.

Figures 1, 3:
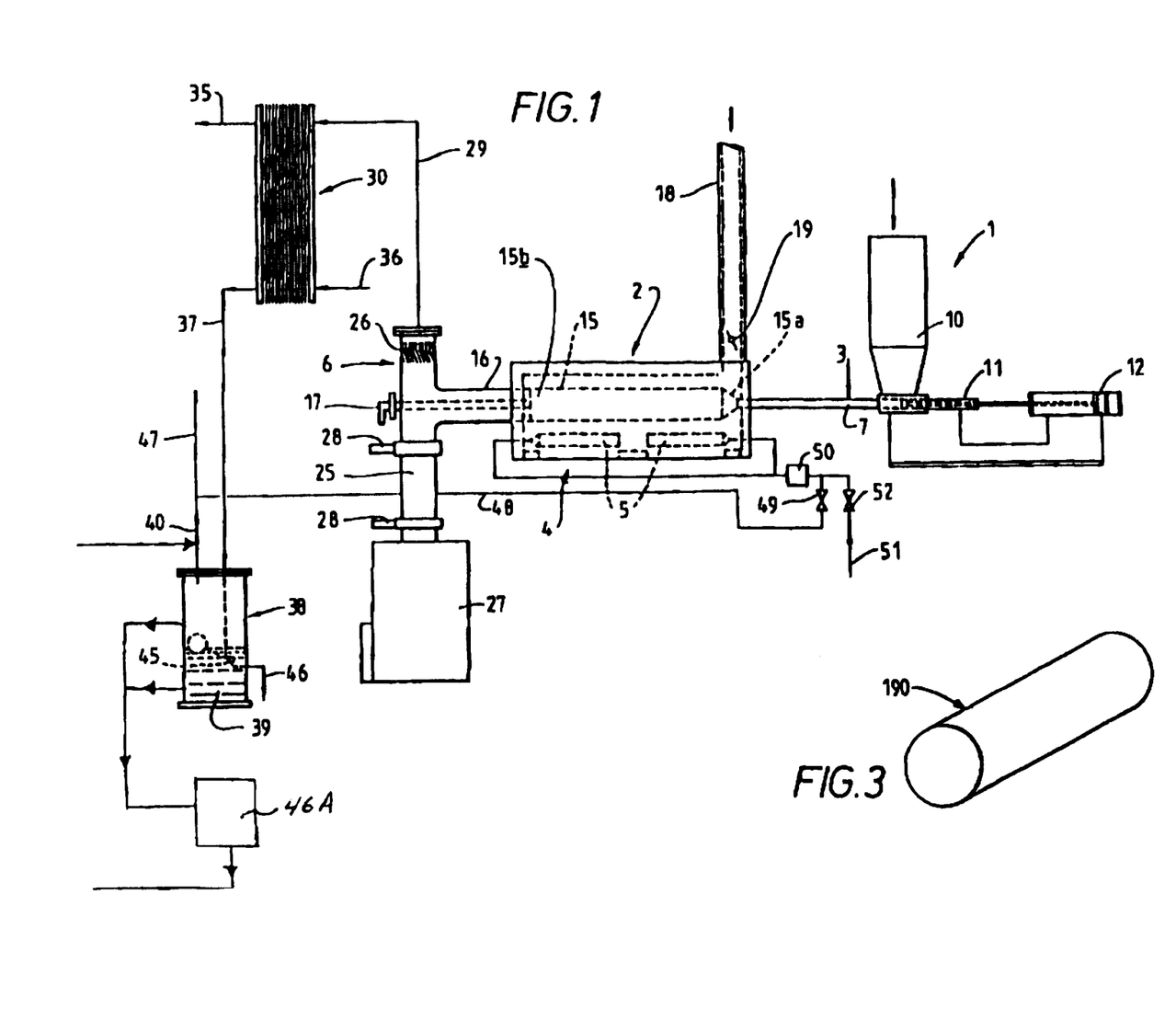
FIG. 1 is a semi-diagrammatic illustration of a first embodiment.
FIG. 3 is a view in perspective of a fuel block 190, used in a non-illustrated modification.

With reference to FIG. 1, apparatus 1 for producing gaseous energy (fuel) from waste material is shown thereby.

The apparatus 1 comprises an oven 2, means 3 for continuously feeding gas-producing waste material to the oven 2, means 4 in the form of gas burners 5 for heating the waste material while in the oven 2, and means 6 for collecting gaseous fuel liberated by heating the waste material.

The oven 2 and feeding means 3 connected thereto are of airtight construction, so that combustion of the waste material is not allowed to take place. The airtight oven 2 has a central gasifier section 15 having an inlet end 15a and an outlet end 15b.

In the gasifier section 15 the waste is subjected to high temperature, say 800° C.

In the embodiment shown in FIG. 1, the means 3 for feeding the gas-producing waste material to the oven 2 comprise a garbage hopper 10, a garbage feeder ram 11 and an airtight feeder duct 7. The ram 11 is operated by a hydraulic piston/cylinder unit 12, and serves to compact and to drive the waste along the airtight feeder duct 7 between the hopper 10 and the gasifier section 15 of the oven 2.

The feeder duct 7 is connected to the inlet end 15a and an outlet duct 16 is connected to the outlet end 15b. A screw form of ash rake 17 is sealingly disposed in the outlet duct 16 and is rotatable therein by a motor (not shown) to assist passage of the waste material. The oven 2 has an outlet chimney 18 whereby exhaust gas resulting from use of the gas burners 5 can escape to atmosphere. The chimney 18 is provided with a control damper 19.

The outlet duct 16 extends into a gas/ash collection vessel 25, having an upper end which houses a gas filter 26 and a lower end connected to an ash receptacle 27. Stop valves 28 are provided whereby ash removed from the oven 2 by the rake 17 is passed to the receptacle 27 without allowing gas to escape from the vessel 25.

In a preferred embodiment (not shown) the ash rake is dispensed with, and vessel 25 is in the form of a cyclone separator for separating the gas and ash.

Gaseous fuel passing through the filter 26 enters a discharge line 29 connected to a gas chiller unit 30. The unit 30 has a hot water/steam outlet 35, a cold water inlet 36, and a covered gas/vapour outlet 37.

The outlet 37 discharges to a separator 38 wherein condensate 39 is collected, and gaseous fuel allowed to leave by way of a discharge line 40. The condensate comprises water and tars. A float-controlled valve 45 operates to discharge excess condensate to a drain line 46. The gas and tar may, if desired, be recombined in suitable proportions and fed into a cracking chamber 46A to break down larger molecules, including organic toxins, into small molecules, by heating so as to produce a greater overall quantity of gas, and to destroy the organic toxins.

The gas discharge line 40 incorporates a branch line 47 whereby usable gas is led away for employment elsewhere, and a further branch line 48 whereby gas is fed to the oven burners 5 by way of a regulator valve 49 and a gas burner control unit 50.

In addition, or as an alternative merely to start up the gasification process, another supply of gas such as natural gas may be fed to the burner control unit 50 by way of a supply line 51 provided with a control valve 52.

In operation, waste material, such as garbage, is fed to the hopper 10 after being screened, in order to remove unwanted substances such as metals, ceramics and glass.

The waste material is also preferably shredded before being fed to the hopper 10.

In the gasifier section 15, gas is driven off, which enters the line 29 by way of the upper end of collection vessel 25. Meanwhile ash enters the lower end of vessel 25 by way of the valves 28. The upper valve 28 is opened first, and then ash allowed to pass through. The upper valve 28 is then closed, and the lower valve 28 opened to allow the ash to pass into the receptacle 27. The lower valve 28 is then closed.

After cooling, the ash is removed from the receptacle 27 and, for example, spread over a landfill site.

Where the waste material is carbonaceous, (for example, comprising used automobile tires), if the ash removed is charcoal enriched, then this ash may be used as carbon filter material.

Before the collected gas enters the discharge line 29, it passes through the filter 26 whereby ash particles are removed. The gas then flows through the chiller unit 30 where it is cooled, (to say 5°–15° C.) before passage to the separator 38.

Gas discharged to the line 47 comprises usable gaseous fuel.

A portion of the produced gas is then fed to the oven burners 5, to supplement or replace the gas supplied by the line 51.

Preferably more than one apparatus is made use of. For example two separate apparatus, one of which is fed with relatively low calorific value garbage and the other with relatively high calorific value garbage. The gas produced by each apparatus may then be subsequently mixed, in a controlled manner, to provide usable gas of desired proportions.

Figure 2:
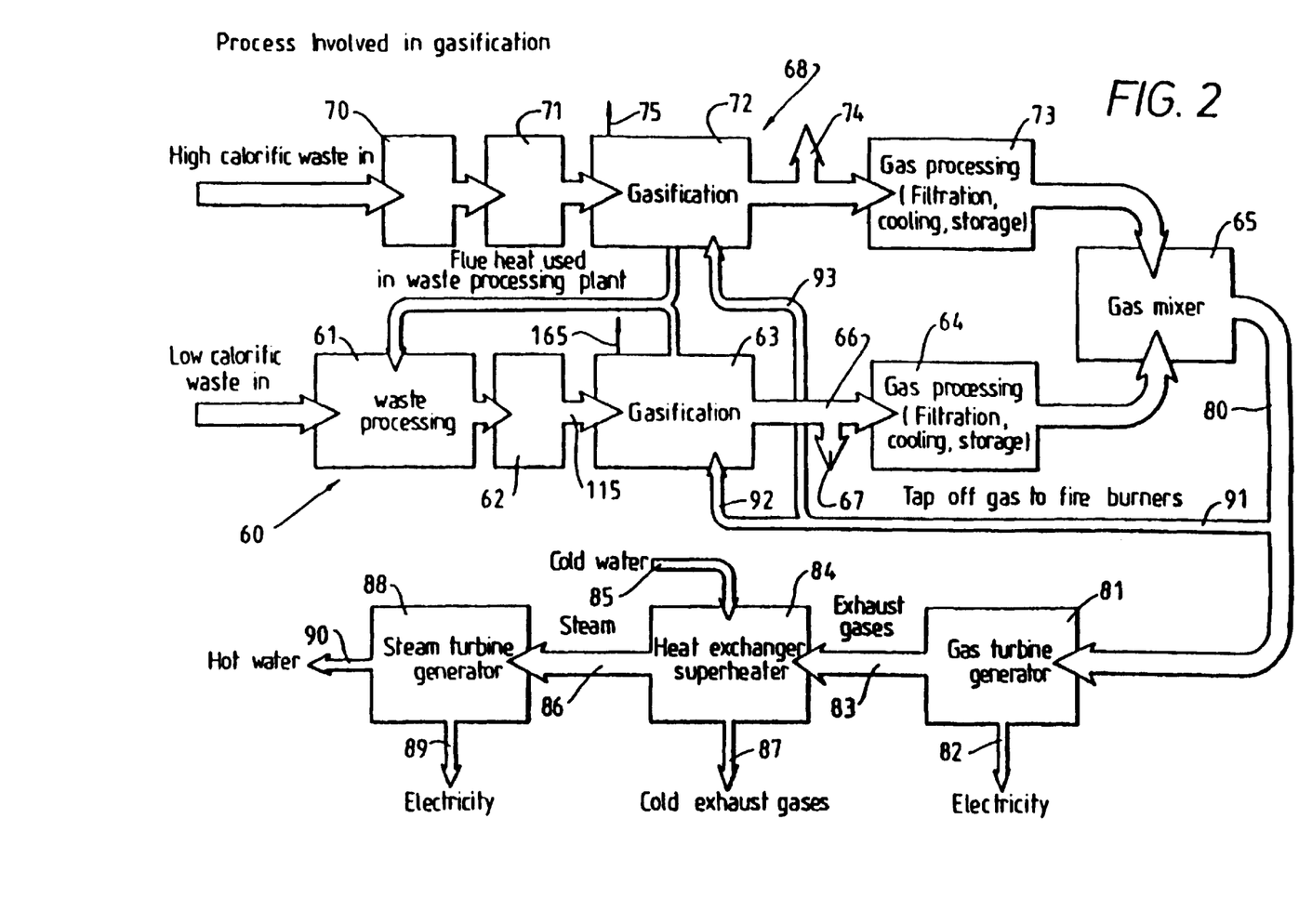
FIG. 2 is a diagrammatic illustration of a second embodiment.

FIG. 2 illustrates such an arrangement, wherein relatively low calorific value waste material is supplied to apparatus 60 and relatively high calorific value waste material in a separate (similar) apparatus 68, which operates in parallel with apparatus 60.

In apparatus 60, waste processing takes place at 61. This comprises taking unsorted waste material such as domestic waste material, shredding it, and separating cut ferrous and non-ferrous metals, as well as ceramics. Ferrous metals are separated out by magnetic means. Non-ferrous metals are separated out by eddy-current means. An endless belt conveyor subjected to vibration is used to separate out ceramic materials. Similar conveyors are also employed-at the metal separation stages.

Separated out metals are employed in subsequent re-cycling operations.

The sorted material comprises small size particles, of about 4.00 to 6.00 mm diameter.

The sorted material may then be subjected to a drying operation, using hot air.

In the embodiment of FIG. 2 the material is then continuously fed, using feed means 62, which also serves to compact the material, to an airtight oven or gasifier 63 where it is subjected to high temperature, (say 800° C.) without allowing combustion to take place. Here gas is driven off, to be subjected, in a processing unit 64, to processing such as scrubbing, filtration, cooling and storage before being discharged to a mixing container 65. A line 66 (see also FIG. 5), connects the gasifier 63 and the processing unit 64. Ash is removed, by way of a valved duct 67, for subsequent use or disposal.

In the case of apparatus 68, unsorted waste material, such as high calorific value industrial material, including packaging and plastics materials are processed at 70 before being fed to a feed means 71. Processing may comprise shredding only. After drying (if required) the waste material is fed to an airtight oven/gasifier 72 by the feed means 71. Gas driven off is subjected to processing at 73. The conveyor means 71, gasifier 72 and processing unit 73 are of substantially identical form to units 62, 63 and 64 respectively.

Ash is removed, by way of a valved duct 74, for subsequent use.

After processing, the gas is discharged to the mixing container 65.

Gas flows from the container 65 along a line 80 to the gas inlet of electricity-producing means comprising a gas turbine generator unit 81 whereby electrical power is produced and fed to a power line 82. The turbine exhaust gases are discharged, by way of a duct 83, to a heat exchanger 84 which incorporates a steam superheater. The heat exchanger 84 has a feed water inlet 85, an outlet 86 for superheated steam and a turbine exhaust gas outlet 87.

Steam discharged from the outlet 86 is fed to further electricity-producing means, comprising a steam turbine generator unit 88 whereby further electrical power is produced and fed to a power line 89. Exhaust from the turbine of the unit 88 is discharged, as hot water, by way of an outlet duct 90.

The gas flow line 80 has a main branch line 91 which feeds subsidiary branch lines 92, 93, whereby gas fuel is fed to the burners (not shown) of gasifiers 63, 72, in order to heat the waste material contained therein. The gasifiers are provided with exhaust gas chimneys 165, 75 corresponding to chimney 18 of FIG. 1.

The feed means 62 or 71 of the embodiment in FIG. 2 may be used for a single apparatus, for example in place of the feed means 3 of FIG. 1.

Figure 4:
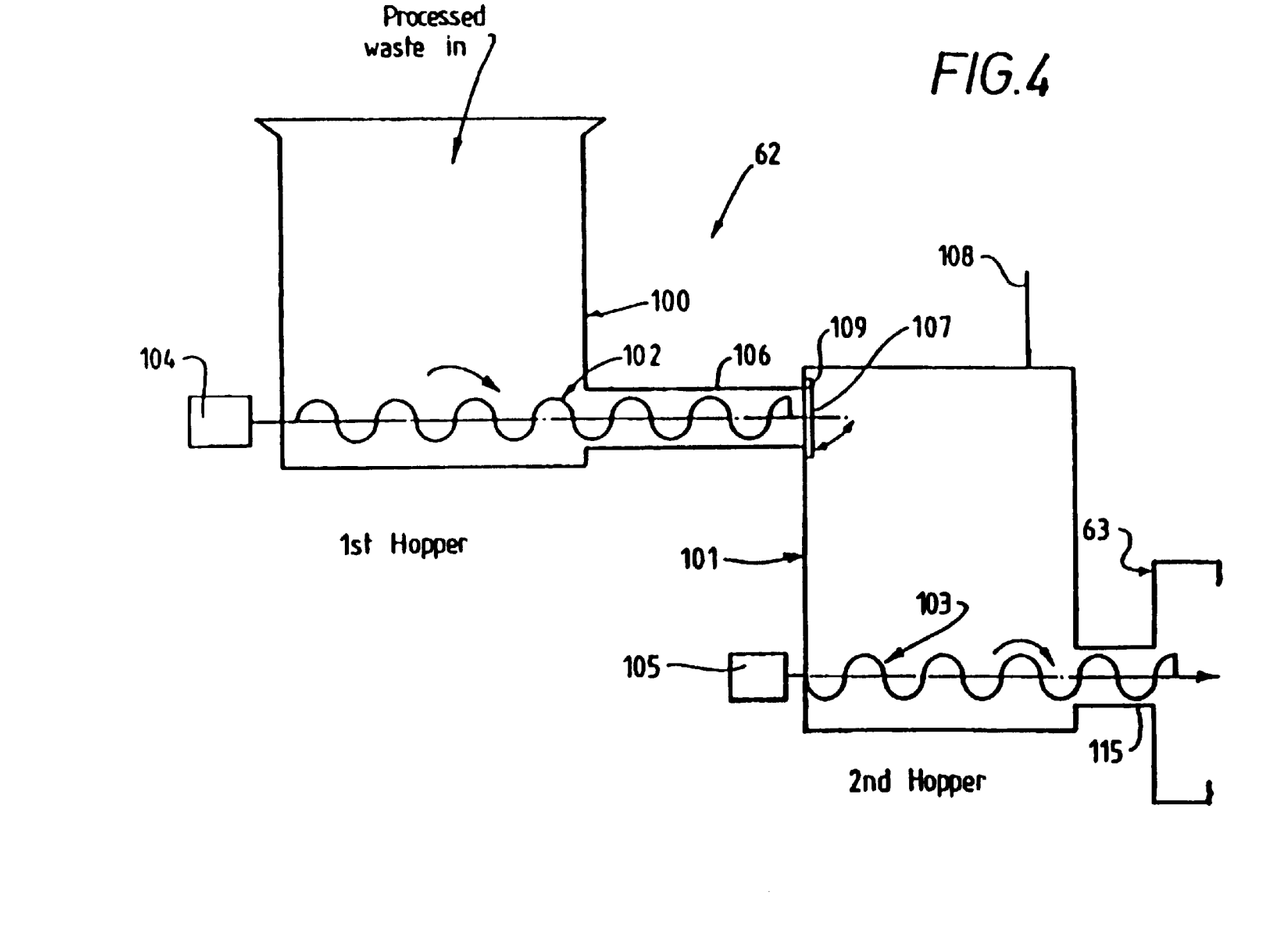
FIG. 4 is a side view, in section, of the feed means 62 of FIG. 2.

FIG. 4 shows one form for the feed means 62 or 71, which comprises a two-stage system using first and second hoppers 100, 101, with first and second screw conveyors 102, 103 disposed in their lower interiors.

Conveyor 102 is driven by an external motor 104, and conveyor 103 by an external motor 105.

The discharge end of conveyor 102 is disposed in a duct 106 interconnecting the lower end of hopper 100 with the upper end of hopper 101, hopper 100 being disposed at a higher level than hopper 101.

A flap valve 107 serving as non-return gas sealing means is disposed at the outlet end of duct 106, and is pivotable about a hinge 109.

The hopper 100 is open to atmosphere. The interior of the hopper 101 is supplied with an inert gas at slight superatmospheric pressure (about 2.0 lbs per square inch), by way of a line 108 to displace air in the waste. The blanket of inert gas; may comprise exhaust gas tapped off chimney 165 (FIG. 2) or other unreactive gas such as carbon dioxide or nitrogen. The duct 106 and flap valve 107 serve as gas lock means between the hoppers 100 and 101 and thus restrict entry of air into the hopper 101 by way of the hopper 100.

Processed waste material is supplied to the hopper 100 and is discharged therefrom, in compacted form (so further reducing any air content of the material), by the screw conveyor 102, along the duct 106.

The discharged waste material causes the flap valve 107 to lift and allow the material to enter the hopper 101.

The screw conveyor 103 then discharges the transferred waste material, again in compacted form, from the hopper 101 and into the gasifier 63, by way of a feed duct 115.

Figure 8:
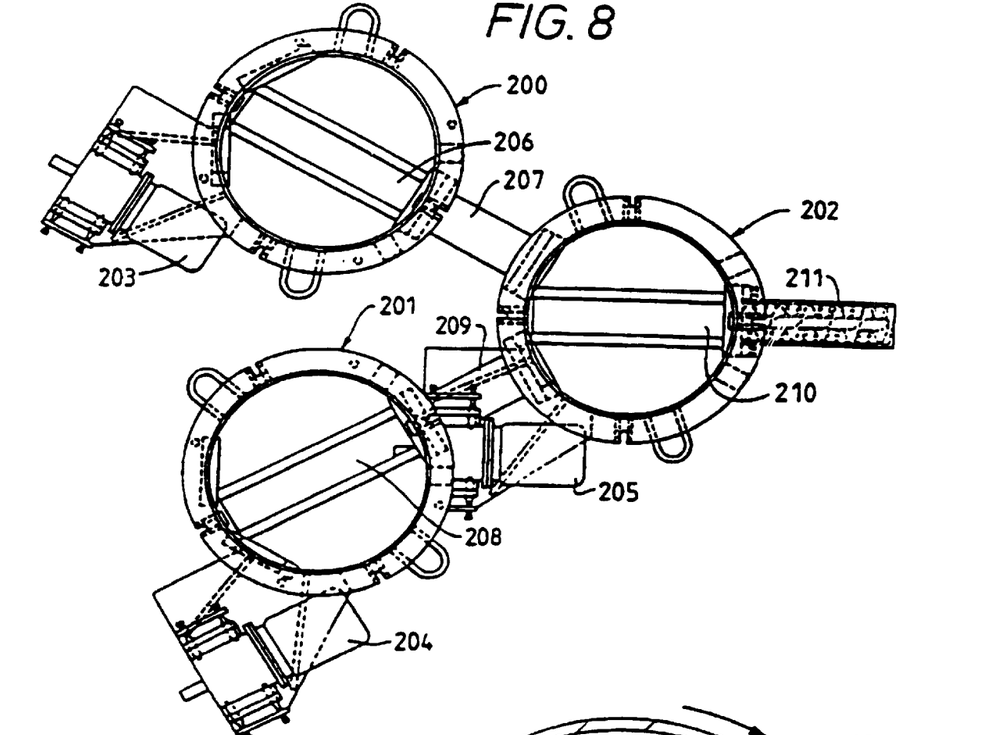
FIG. 8 is a plan view of feed means suitable for feeding waste material to the gasifier drum of a preferred embodiment.

FIG. 8 shows an alternative, preferred, form of the feed means 62 or 71 which comprises a pair of primary hoppers 200, 201 and a secondary hopper 202. The primary hoppers 200, 201 are loaded alternately with waste for feeding to the secondary hopper 202 by respective screw conveyors 206, 208 via respective ducts 207, 209.

When one of the primary hoppers has discharged its load to the secondary hopper, its duct is sealed from the secondary hopper by valve means (not shown) and the hopper is then opened to the atmosphere for refilling. During refilling, the other primary hopper may be discharging its load to the secondary hopper.

Once a primary hopper is filled it is closed and purged with carbon dioxide or other inert gas, in order to expel air from the waste through a vent valve (not shown) to atmosphere. Following purging the valve means between the hopper and the secondary hopper is opened and a motor 203 or 204 is switched on to drive the respective screw conveyor 206 or 208 to transfer the waste to the secondary hopper 202.

The secondary hopper screw conveyor 210 may be driven continuously by motor 205 to ensure a continuous supply of waste along the duct 211 to the gasifier oven.

The secondary hopper is also supplied with carbon dioxide or other inert gas, maintained at a pressure sufficient to substantially prevent backflow of generated gases to the secondary hopper from the gasifier, or the entry of purged gases from the primary hoppers.

Figure 5:
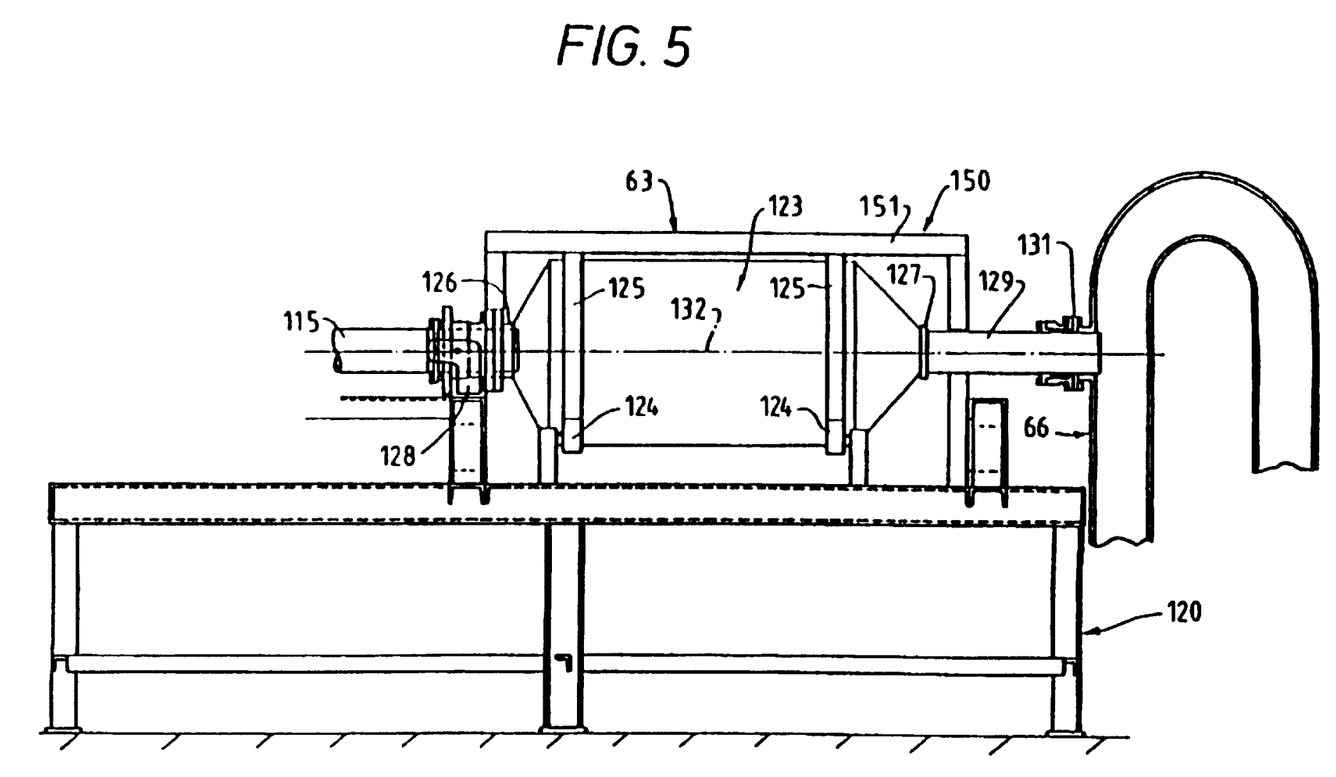
FIG. 5 is a side view of the gasifier 62 of FIG. 2.

FIG. 5 shows the gasifier 63 mounted on a chassis 120. The gasifier 63 comprises a rotatable drum 123 mounted on spring-loaded drive wheels 124, the peripheries of which engage with circular driving bands 125 carried by the drum 123. The wheels 124 react against the weight of the drum 123 and its contents. The wheels 124 are driven by electric motor and chain drive units (not shown).

The drum 123 has an inlet 126 (FIG. 5) and an outlet 127. The inlet 126 is connected to the stationary discharge pipe duct 115 (FIG. 4) by way of a rotatable seal unit 128. The outlet 127 incorporates a rotatable gas outlet pipe 129 connected to the stationary line 66 (FIG. 2). A gland unit 131 seals the pipe 129 to the line 66 and allows relative rotation therebetween.

The drum 123 is rotatable about a substantially horizontal axis 132. If desired, the drum may be tilted however, by suitable modification of the associated drive and support structure, so that the axis 132 is no longer substantially horizontal.

Figure 6:
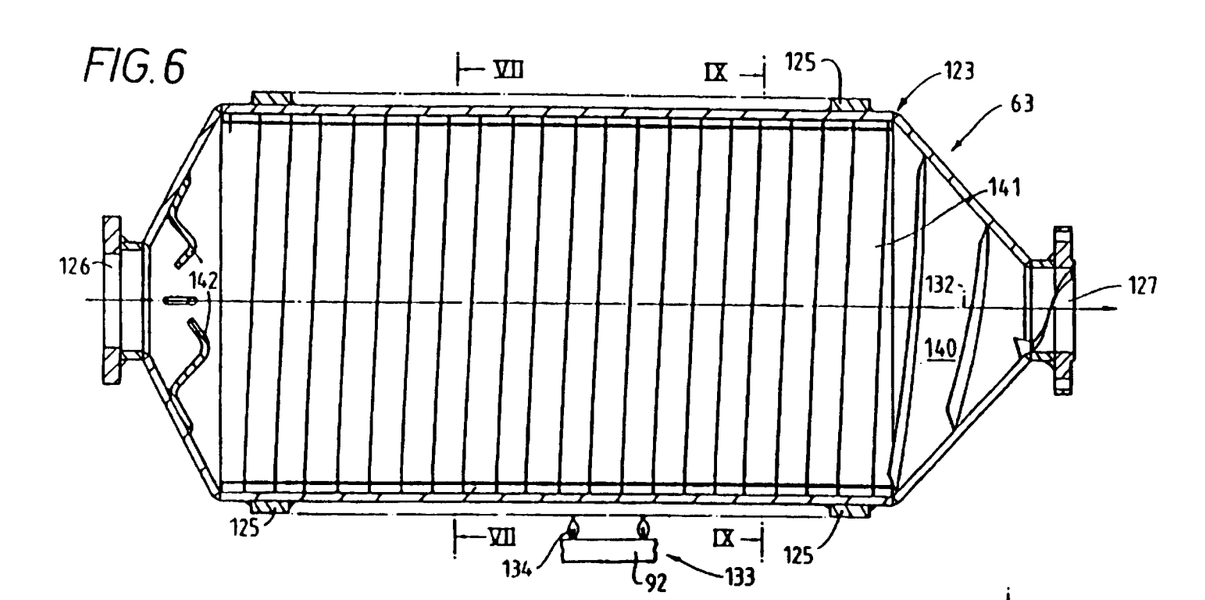
FIG. 6 is a side view, in section, of the gasifier drum 123 shown in FIG. 5.
Figure 7:
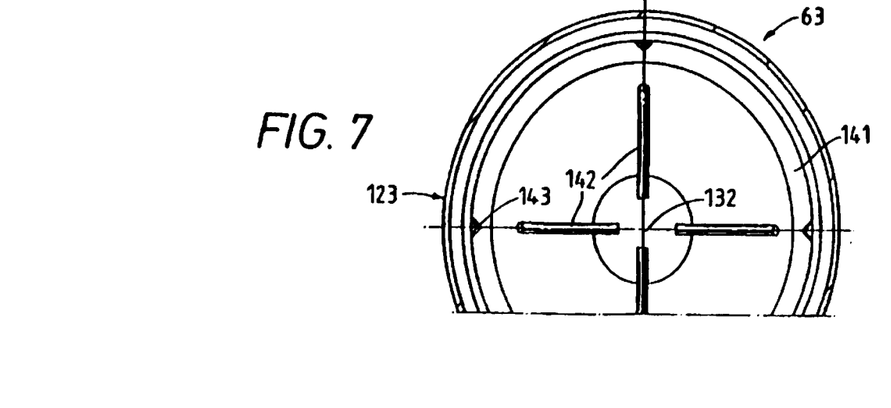
FIG. 7 is an end view in section, taken on the lines VII—VII of FIG. 6.

FIGS. 6 and 7 show the drum 123 in further detail.

FIG. 6 shows the drum 123 provided with means 133 for heating the drum exterior, the means 133 comprising the gas branch line 92 and gas burners 134 supplied thereby.

The drum 123 is of welded steel construction. The interior 140 of the drum houses a mild steel strip 141 wound in spiral form around the rotational axis 132 and secured, by welding, to the inner surface of the drum.

Angular pins 142 are secured to the drum interior adjacent the inlet 126 thereof. The pins 142 vary in effective length and their outer, or unsecured ends are offset relative to the central axis 132. (See FIG. 7.) Inwardly projecting strips 143 are secured to the interior of the drum 123. The strips 143 which are equi-spaced, extend longitudinally along the drum interior. They co-operate with the spiral strip 141 and pins 142 in providing structural means operable to break or churn up and mix the waste material. The spiral strip 141 further serves as a screw conveyor, causing the broken up material to pass along the interior of the drum 123 towards the outlet 127 thereof. Passage of the material takes about 10 minutes.

Figure 9:
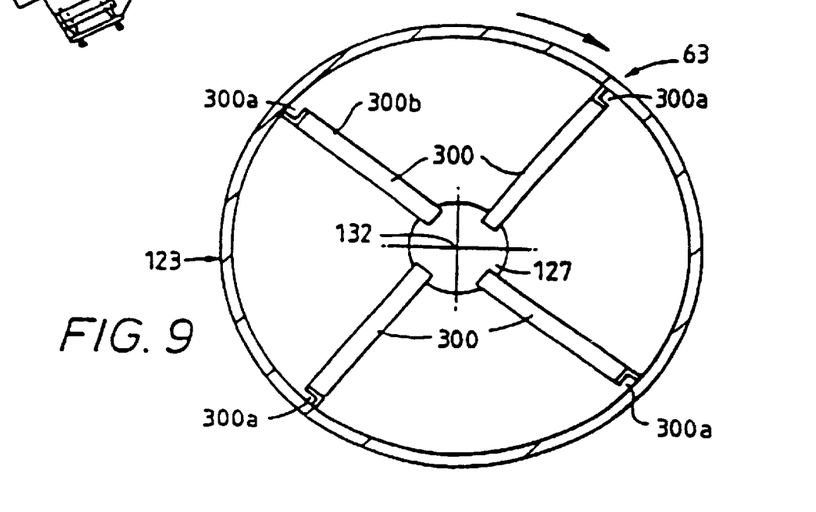
FIG. 9 is an end view, taken on the lines IX—IX of FIG. 6.

In a preferred embodiment the portion of the mild steel strip 141 (FIG. 6) that is located in the frusto-conical outlet end of the drum 123 is replaced by channel means for scooping up ash from the bottom of the drum 123 and for raising the ash above the drum axis of rotation 132 so that the ash then slides downwards from the channel means into the drum outlet 127. The channel means may comprise a series of channel defining members 300 attached to the drum which are preferably disposed parallel to planes containing the axis of rotation 132 of the drum 123 as shown in FIG. 9, each member being elongate and of a section, such as an L-shaped section suitable to define a respective channel 300a for scooping up and retaining the ash and, on being raised to a position above the axis 132, such as 300b, for allowing the ash to slide down the channel and into the outlet 127.

Alternatively the channel means may comprise a single elongate pipe member (not illustrated) attached to the drum and which typically defines a channel disposed substantially parallel to a plane of the drum containing the drum axis of rotation, one end of the pipe member being provided with an inlet opening, whilst the other end is provided with an outlet opening. Preferably the inlet opening is joined to the end of the spiral channel which is formed in between the coils of the spiral strip 141 in the cylindrical portion of the drum 123 and which is that end of the spiral channel nearest to the outlet 127, such that substantially all of the ash leaving that end of the spiral channel, enters directly into the inlet opening of the pipe as this is raised during rotation of the drum 123. When the pipe member has been lifted up to a sufficient level, the ash slides down through the pipe member and out of the outlet opening into outlet 127. The end of the pipe member having the outlet opening preferably projects into the outlet 127, which may conveniently be provided with ash driving means, such as a further spiral strip of mild steel, for driving the ash along outlet 127 away from the drum 123. Guide means adjacent to the outlet opening of the pipe member may be desirable, for example in the form of a plate, for directing the ash from the outlet opening into the ash driving means.

As shown in FIG. 5, the rotatable drum 123 is housed in a box-like enclosure 150 lined with thermal insulation 151.

Figure 10:
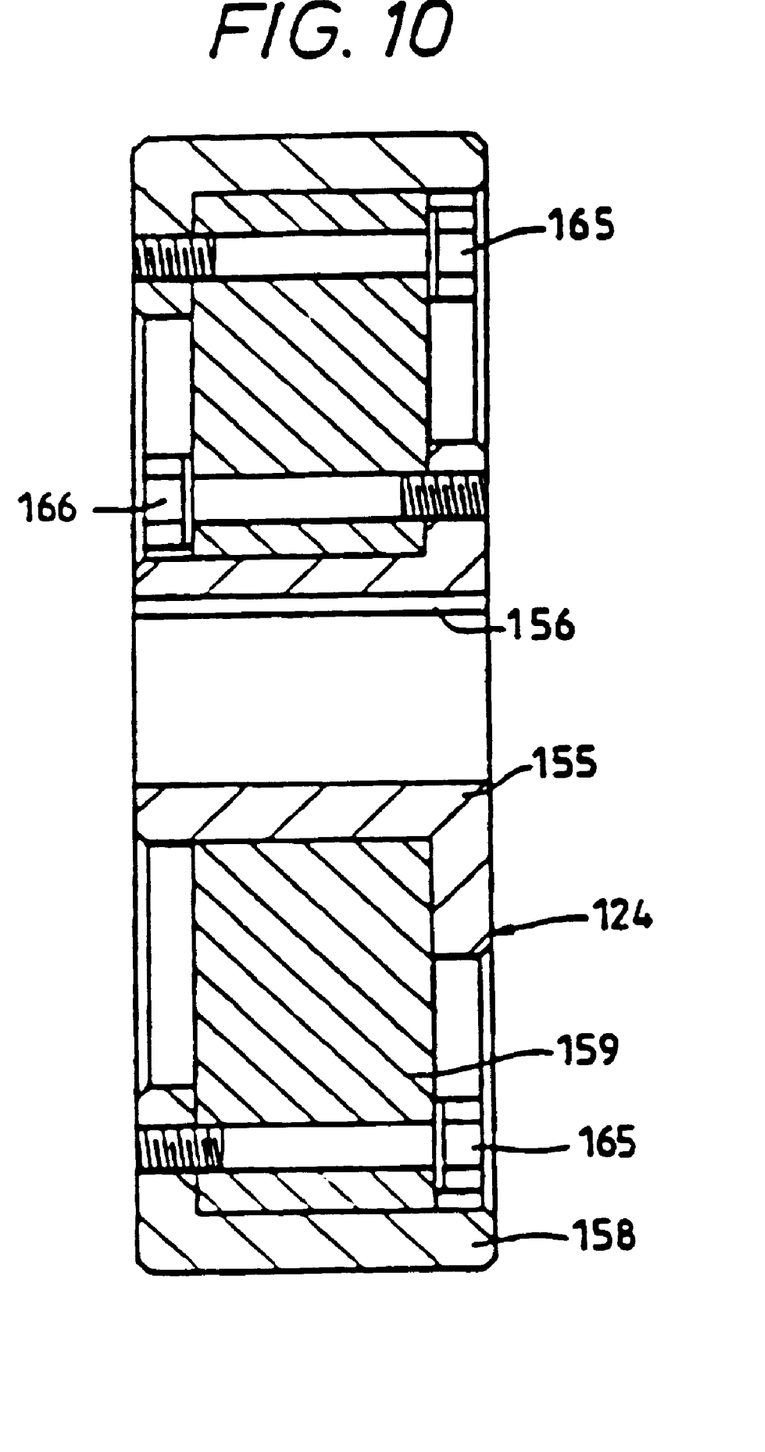
FIG. 10 is a side view, in medial section, of a drum drive wheel 124.

FIG. 10 shows a drive wheel 124 in further detail. The wheel is of composite form and comprises a steel central hub portion 155, with a keyway 156, for mounting on a shaft 157 (FIG. 9), a steel outer rim or tire portion 158, and an intermediate portion 159 of load accepting heat insulating material. Bolts 165, 166, secure the three portions 155, 158, 159 together.

Figure 11:
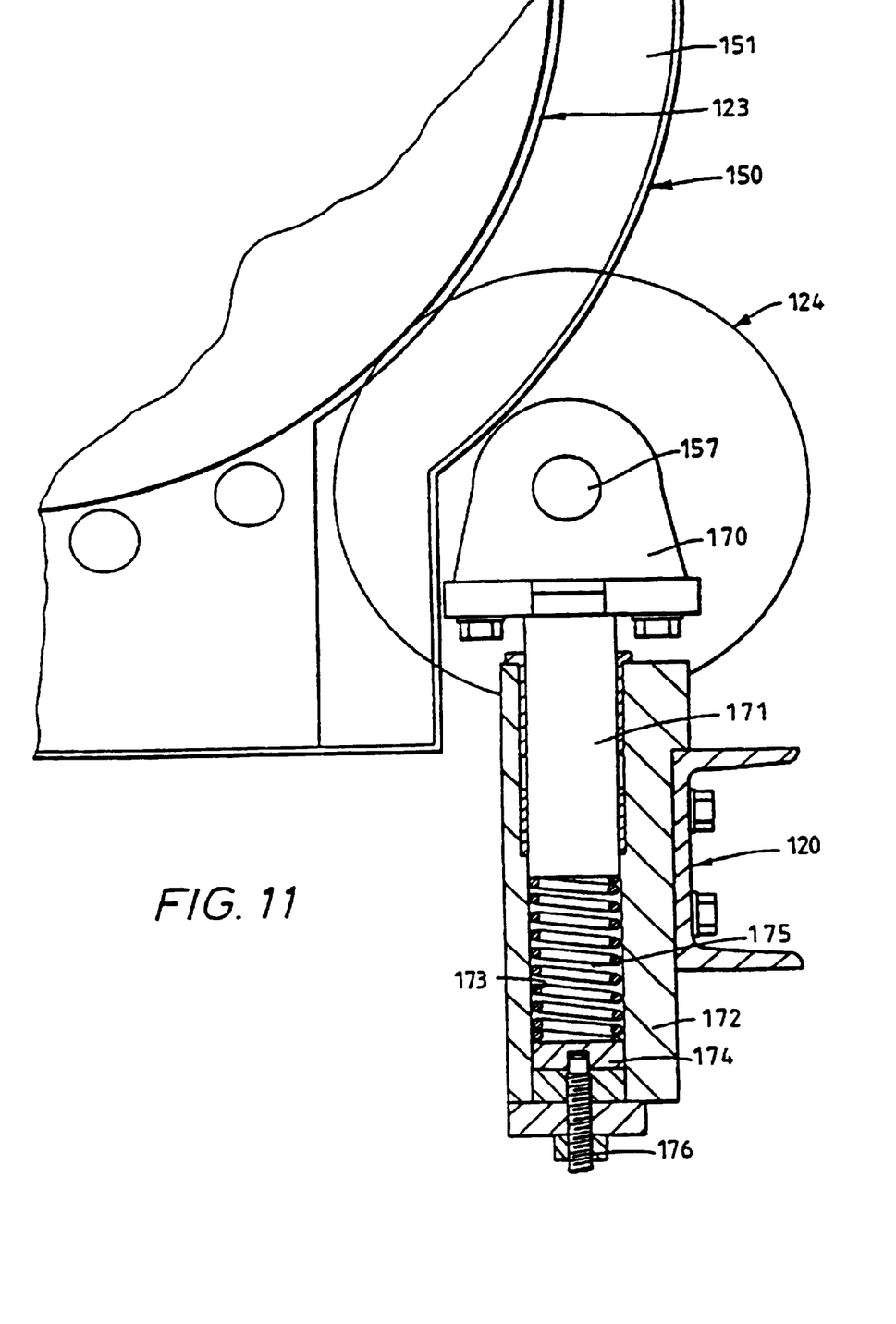
FIG. 11 is an end view, partly in section, which shows how a drum drive wheel 124 is spring mounted.

FIG. 11 shows how the drive wheels 124 are spring-mounted. The shaft 157 of a wheel 124 is mounted for rotation between the forks of a bifurcated support bracket 170. The bracket 170 is mounted on the upper end of a pin 171 slidably located within a support block 172 secured to the chassis 120. A compression spring 173 is disposed between the lower end of the pin 171 and a disc 174 disposed within the interior 175 of the support block 172. A lockable adjusting screw 176 mounted for rotation in the lower end of the block 172 is used to adjust the compressive load on the spring 173, and thereby the spring loading on the drive wheel 124.

In a non-illustrated modification, the waste material is compacted under substantial pressure so as to form cylindrical fuel blocks 190 (FIG. 3) before being fed to the gasifier 63. A fuel block 190 is about 90.00 mm in diameter, about 300.00 mm in length, and weighs about 250.00 gm.

The discrete fuel blocks 190 are subsequently fed, under pressure imposed by a feeding ram, into the drum 123 of the gasifier 63.

Figure 12:
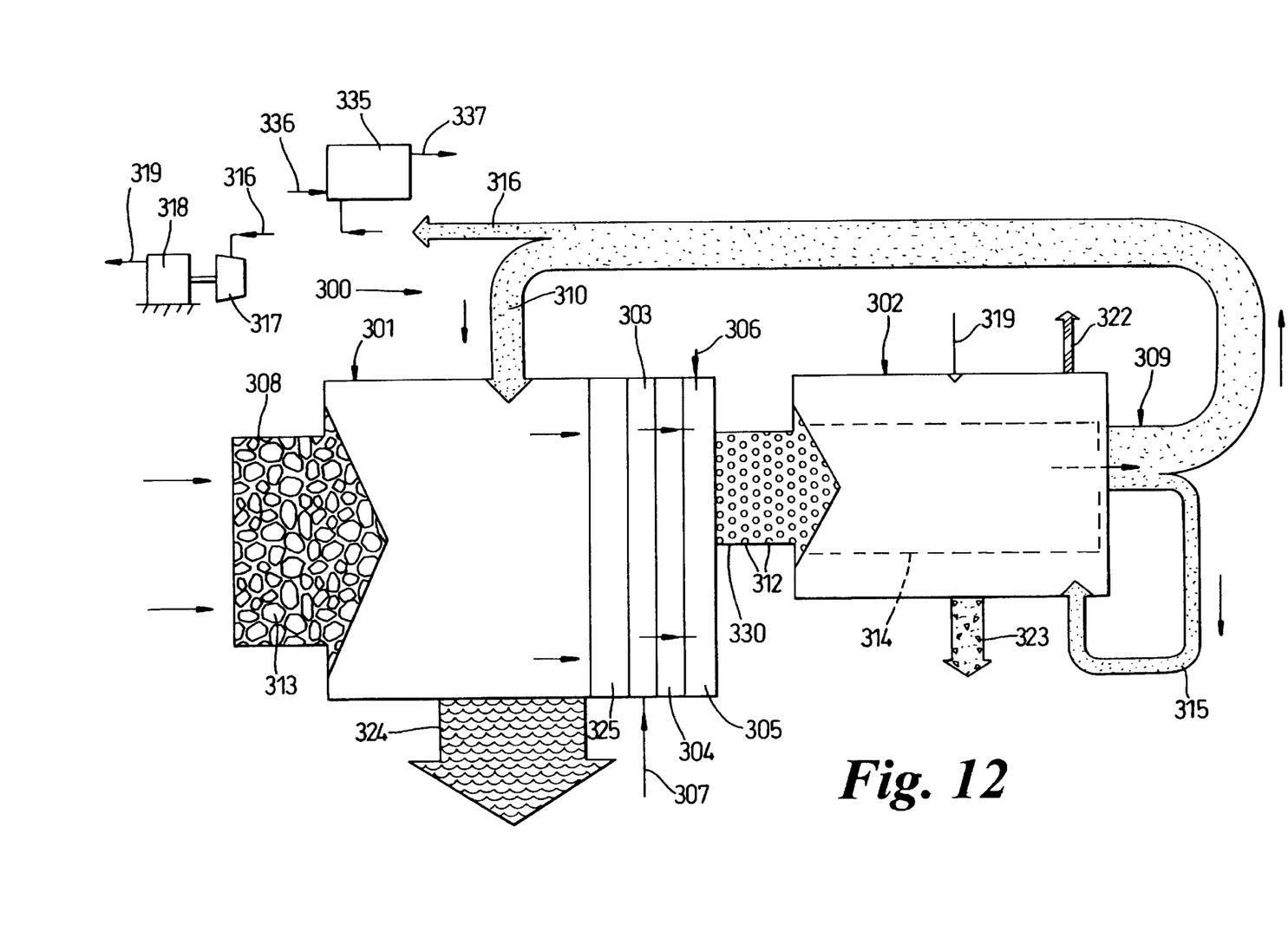
FIG. 12 is a diagrammatic illustration of a third embodiment.

FIG. 12 illustrates apparatus 300 whereby gaseous energy is used to power a de-watering and drying process in order to produce pellets of sewage material.

The apparatus 300 comprises a de-watering and drying unit 301 and a gasifier unit 302 (corresponding to gasifier 63). The unit 301 incorporates a first stage hopper 303, a conveyor section 304, a second stage hopper 305, and an inert-purge gas line 306, diagrammatically corresponding to hopper 100, conveyor 102, hopper 101 and line 108 of FIG. 4. An inert purge gas entry line 307 to hopper 303 is also provided.

In operation, wet sewage 313 is fed to the unit 301 by a large volume duct 308. Within the unit 301 the sewage is de-watered and dried, using hot gas discharged from the gasifier unit 302 by way of a branch 310 of an outlet duct 309.

The duct 309 has further branch lines, namely 315 (which corresponds to branch line 35), whereby gaseous fuel is used to heat waste material in the gasifier unit 302, and 316, whereby excess gaseous fuel can be used, for example, to power a small gas turbine 317 driving an electrical generator 318.

Electrical power from the generator 318 can be supplied to the gasifier unit 302, by way of a line 319, where it is employed, for example, in rotating its oven drum 314 (which corresponds to drum 123).

The gasifier unit 302 also has a flue gas outlet duct 322 and a carbon/ash outlet duct 323.

Water extracted from sewage entering the de-watering and drying unit 301 is drained away by a duct 324. After drying, the sewage passes to a pellet manufacturing section 325, where the pellets are produced by compacting the dried sewage under substantial pressure.

Sewage pellets 312 produced in section 325 then pass through the hoppers 303 and 305 to be continuously fed to the gasifier oven drum 314. Air is substantially restricted (by inert purge gas lines 306, and, if required, 307) from passing from hopper 303 to hopper 305. The pellets are then supplied to the oven drum 314 in a continuous manner and by way of a duct 330 and using a ram, if necessary, to be heated without allowing combustion to take place, so as to produce gaseous energy which is discharged through duct 309.

Another possible application of the gaseous energy produced by the invention may comprise the generation of hot water or steam for local heating systems. This is illustrated by FIG. 12 wherein hot gas branch line 316 is used to supply a steam generator 335 in addition to, or instead of, the turbine 317. The steam generator 335 has a cold water inlet 336 and a hot water or steam outlet 337.

Alternative feedstock to sewage include wood pulp, municipal solid waste, and other waste materials where the gaseous energy may be employed for heating and de-watering purposes. Pellets may be produced (using manufacturing section 325) from such materials.

The apparatus 300 may be duplicated, if required, and the outputs of gaseous energy mixed, as taught by FIG. 2.

We claim:

1. A method of gasifying waste material to produce gaseous energy in an apparatus comprising at least one first hopper means and a second hopper means, both for accommodating said waste material, said first and second hopper means being interconnected by a transfer duct with a non-return gas sealing means at entry to the second hopper means, purging means being provided so as to introduce inert gas into the second hopper means and a gasifier connected to the second hopper means, said method consisting of the following steps:

(a) transferring waste from the first hopper means to the second hopper means by way of said transfer duct;
    (b) preventing air passing from the first hopper means to the second hopper means during the transfer by use of the inert gas purging means;
    (c) closing the non-return valve means;
    (d) purging the waste in the second hopper means;
    (e) transferring the waste from the second hopper means to the gasifier; and
    (f) heating the waste in the gasifier at a pressure greater than atmospheric without allowing combustion to take place.

2. The method claimed in claim 1, wherein the first hopper means is disposed at a higher level than the second hopper means.

3. The method claimed in claim 1, wherein a first conveyor means is used to transfer the waste material from the first hopper means to the second hopper means.

4. The method claimed in claim 3, wherein a second conveyor means is used to remove waste material from the second hopper means.

5. The method claimed in claim 3, wherein the first conveyor means comprise screw conveyor means.

6. The method claimed in claim 1, wherein heating of the waste material takes place without subjecting the waste material to steam and air.

7. The method claimed in claim 1, wherein heating the waste material liberates other volatile products in addition to the gaseous energy, and the volatile products and the gaseous energy are separated by condensing the volatile products.

8. The method claimed in claim 7, wherein at least some of the condensed volatile products are heated in cracking means to produce further gaseous energy.

9. The method claimed in claim 8, wherein a mixture comprising suitable proportions of the separated volatile products and of the gaseous energy is heated in the cracking means to produce further gaseous energy.

10. The method claimed in claim 1, wherein heating of the waste material takes place in two or more separate apparatus, gaseous energy produced by each apparatus being mixed together prior to use.

11. The method claimed in claim 1, wherein the waste material is compressed into discrete blocks before being heated.

12. The method claimed in claim 1, wherein the gaseous energy is combustible fuel.

13. The method claimed in claim 1, wherein the gaseous energy so produced is used to generate electricity by employing said gaseous energy to drive electricity generating means.

14. The method claimed in claim 1, wherein the gaseous energy so produced is used to de-water waste material.

15. The method claimed in claim 14, wherein the de-watered waste material is used to form pellets which are subsequently heated to produce said gaseous energy.

16. The method claimed in claim 1, wherein the gaseous energy is used to generate hot water.

17. The method claimed in claim 1, wherein the gaseous energy is used to generate steam.

18. Apparatus comprising an oven, feed means for continuously feeding the waste material to the oven, means for heating the waste material while in the oven without allowing combustion to take place, means for collecting gaseous energy liberated by heating the waste material, the oven feed means including at least a first hopper means and a second hopper means, both for accommodating the waste material, a transfer duct interconnecting the first hopper means and the second hopper means, a non-return gas sealing means at entry to the second hopper means, and purging means operable to introduce inert gas into the second hopper means, whereby the waste material is transferred from the first hopper means to the second hopper means before heating takes place, air being prevented from passing from the first hopper means to the second hopper means by use of said purging means and pressure in the oven being maintained at greater than atmospheric pressure wherein the oven comprises a drum rotatable about a substantially horizontal axis, the drum having an inlet and an outlet wherein the drum is provided with channel means for scooping up waste material ash from the bottom of the drum and for raising the ash above the drum axis of rotation so that the ash then slides downwards from the channel means into the drum outlet.

19. Apparatus as claimed in claim 18, wherein the channel means comprises an elongate member which defines a channel disposed substantially parallel to a plane of the drum containing the drum axis of rotation.

20. Apparatus as claimed in claim 18, wherein the elongate member is substantially L-shaped in cross-section.

21. Apparatus as claimed in claim 18, wherein the channel means comprises a pipe member having an inlet opening joined to the end of a spiral channel defined by the said structure of spiral form such that, in use, substantially all waste material ash leaving the end of the spiral channel enters directly into the inlet opening of the pipe as said inlet opening rises during rotation of the drum.

22. Apparatus as claimed in claim 21, comprising guide means adjacent an outlet opening of the pipe member for directing ash from the outlet opening into ash driving means adapted to drive ash along towards the drum outlet.

* * * * *